United States Patent
Zerafati et al.

(10) Patent No.: US 6,225,365 B1
(45) Date of Patent: May 1, 2001

(54) PVC FOAM

(75) Inventors: Saeid Zerafati, Voorhees, NJ (US); Richard M. Crooker, Fogelsville, PA (US); Jinhuang Wu, King of Prussia, PA (US); Michael Q. Tran, Abington, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 0 days.

(21) Appl. No.: 09/552,054

(22) Filed: Apr. 19, 2000

(51) Int. Cl.[7] ........................................... C08J 9/14
(52) U.S. Cl. ............................. 521/98; 521/79; 521/145
(58) Field of Search ................................. 521/79, 145, 98

(56) References Cited

U.S. PATENT DOCUMENTS

| | | | | |
|---|---|---|---|---|
| 4,456,572 | * | 6/1984 | Eguchi et al. | 521/79 |
| 5,278,196 | * | 1/1994 | Robin | 521/145 |
| 5,710,189 | * | 1/1998 | Brandt | 521/91 |

FOREIGN PATENT DOCUMENTS

03273035 A2    6/1991   (JP).

OTHER PUBLICATIONS

"Inert–Gas Extrusion of Rigid PVC Foam" by S.K. Dey et al in the J. of Vinyl & Additive Technology, vol. 2, No. 1, Sep. 1996.

* cited by examiner

*Primary Examiner*—Morton Foelak

(57) ABSTRACT

PVC foam blown with a physical blowing agent comprising a gaseous HFC is provided.

4 Claims, No Drawings

PVC FOAM

BACKGROUND OF THE INVENTION

This invention relates to polyvinyl chloride ("PVC") foam made with physical blowing agents, more particularly to PVC foam blown with one or more gaseous hydrofluorocarbons ("HFC"s) such as HFC-134a (1,1,1,2-tetrafluoroethane).

There are publications (such as "Inert-Gas Extrusion of Rigid PVC Foam" by S. K. Dey et al in the Journal of Vinyl & Additive Technology, March 1996, Vol. 2, No. 1) disclosing the use of inert gaseous blowing agents (such as $CO_2$) and chemical blowing agents (such as azodicarbonamide) for making PVC foams. Chemical blowing agents present disadvantages such as the leaving of residues in the foam and inflexible processing since the blowing agent is water sensitive and usually must be premixed with the PVC. Inert blowing agents such as $CO_2$ tend to restrict the ability to vary the foam density, generally resulting in high density foams. What is desired is a blowing agent which provides processing flexibility and the ability to achieve a range of densities.

BRIEF SUMMARY OF THE INVENTION

PVC foam blown with a physical blowing agent comprising a gaseous HFC is provided.

DETAILED DESCRIPTION

It has now been found that the use of an HFC physical blowing agent allows one to extrude PVC foam which has a variety of foam densities and to avoid the leaving of residues. Low density foams (less than about 0.2 g/cc) are useful as insulation, while medium density foams (on the order of 0.5 g/cc) are useful for applications such as fencing, profile, board and pipe. Since the gaseous HFC blowing agent can be fed to the extruder independent of the PVC, density can be controlled as shown below simply by adjusting the flow rate of the blowing agent relative to the PVC in the extruder. Unlike chlorinated blowing agents, the HFCs also offer the environmental advantage of having zero ozone depletion potential ("ODP").

Examples of gaseous HFC blowing agents are 134a, 152a (1,1-difluoroethane), 32 (difluoromethane), 143a (1,1,1-trifluoroethane), 134 (1,1,2,2-tetrafluoroethane), 245fa (1,1,1,3,3-pentafluoroethane), 125 (pentafluoroethane) and mixtures thereof. Preferred blowing agents include 134a and 152a. Chemical blowing agents such as azodicarbonamide; inert gases such as carbon dioxide and nitrogen; water; and organic compounds such as ethers (for example, dimethyl ether), alcohols and ketones can also be included as a secondary blowing agent, although these auxiliary agents are usually used in minor amounts.

In practice the physical blowing agent(s) is injected into an extruder containing the PVC formulation in molten form. Conventional extruders, such as single screw or twin screw, can be employed.

A typical foam formulation contains PVC resin; a heat stabilizer such as a Thermolite® organotin stabilizer available from Elf Atochem, a Mark 1925 tin stabilizer available from Witco or a lead stabilizer such as a tribasic lead sulfate, a dibasic lead stearate or a dibasic lead phosphate; an impact modifier such as a Metablen® C223 or Metablen E900 core-shell type impact modifier available from Elf Atochem or a non core-shell type modifier such as chlorinated polyethylene; a processing aid such as high and/or low molecular weight acrylic polymers; a lubricant such as paraffin wax, polyethylene wax and/or calcium stearate; a filler such as calcium carbonate or silica; and a pigment such as titanium dioxide. Such formulations are well known in the art. The PVC resin generally has a K value in the order of 50 to 65. "K Value" is a universal measure of molecular weight. K values above 75 are generally considered high, while K values below 50 are generally considered low.

A typical processing temperature is on the order of 175–205° C. The temperature is generally reduced near the end of the extruder, but not below about 140° C. Injection pressure for the blowing agents is a variable which is dependent on the configuration of the particular extruder and is an indication of, and proportional to, the blowing agent flow rate; typical injection pressures are in the range of about 100 to 1500 psig. Lowering of the pressure can be used to increase the foam density.

The amount of blowing agent needed to produce a PVC foam with a certain density depends on several factors, such as the molecular weight of the blowing agent and the bulk density of the polymer matrix. For example, the amount of HFC-134a needed to blow a PVC foam with a 2.0 pcf (pounds per cubic foot) density is around 14 weight % of total resin weight, while about 2 weight % is needed for a PVC foam with a density of 20 pcf. The use of processing aids also assists in lowering foam density.

Various dies can be used at the end of the extruder to generate PVC pipes, sheets, profiles, rods or the like, as desired.

The practice of the invention is illustrated in more detail in the following non-limiting example. A conventional PVC foam formulation was used containing, in Phr, where "Phr" indicates parts by weight per hundred parts of resin:

| Component | Phr |
| --- | --- |
| Oxy 225 PVC resin having a K-value of 65, available from Occidental Chemicals | 100 |
| Thermolite ® 137 organotin stabilizer, available from Elf Atochem | 2 |
| Calcium stearate lubricant | 1.5 |
| Paraffin wax lubricant | 1 |
| AC629A lubricant, an oxidized polyethylene homopolymer, available from Honeywell | 0.2 |
| Durastrength ® 200 core-shell impact modifier, available from Elf Atochem | 6 |
| Acrylic polymer processing aids | 5.4 |
| Calcium carbonate filler | 4 |
| Titanium dioxide pigment | 10 |

The material was fed at a rate of 17.5 pounds per hour through a twin screw extruder operated at a temperature of from 175 to 200° C. and at 75 rpm (revolutions per minute). Blowing agent (134a) was fed into the molten PVC formulations at varying rates by adjusting the injection pressure over a range of about 100 to 1500 psig. The extrudate was measured for density. The results show that increasing the feed rate from 0 to 0.05 mole/minute results in the density dropping from about 1.4 g/cc (at 0 mole per minute) to about 0.4 g/cc (at about 0.05 mole/minute). The lowest density foams for this particular equipment configuration were obtained using an injection pressure of about 280–320 psig. Using a lower molecular weight PVC resin (K value of about 60) and a higher level (7.4 Phr) of processing aids resulted in a lower density foam (about 0.3 g/cc).

What is claimed is:

1. PVC foam blown with a blowing agent consisting of a single gaseous hydrofluorocarbon.

2. PVC foam blown with a blowing agent consisting of a gaseous hydrofluorocarbon selected from the group consisting of 134*a*, 152*a*, 143*a*, 134, 245*fa*, 32, 125 and mixtures thereof.

3. The foam of claim 2 wherein the hydrofluorocarbon is 134*a*.

4. The foam of claim 2 wherein the hydrofluorocarbon is 152*a*.

* * * * *